United States Patent
Chiu et al.

(10) Patent No.: US 10,170,820 B2
(45) Date of Patent: Jan. 1, 2019

(54) WIRELESS COMMUNICATION CIRCUIT AND ELECTRONIC DEVICE

(71) Applicant: ASUSTeK COMPUTER INC., Taipei (TW)

(72) Inventors: Shih-Chia Chiu, Taipei (TW); Shih-Yuan Chen, Taipei (TW); Skye Hui-Hsin Wu, Taipei (TW); Chien-Hao Chiu, Taipei (TW); Wang-Ta Hsieh, Taipei (TW); Wei-Hsin Shih, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 71 days.

(21) Appl. No.: 15/394,776

(22) Filed: Dec. 29, 2016

(65) Prior Publication Data
US 2017/0201006 A1    Jul. 13, 2017

(30) Foreign Application Priority Data

Jan. 12, 2016   (CN) .......................... 2016 1 0018466

(51) Int. Cl.
| H01Q 1/24 | (2006.01) |
| H01Q 1/22 | (2006.01) |
| H01Q 9/04 | (2006.01) |
| H01Q 1/48 | (2006.01) |
| H04B 1/40 | (2015.01) |

(Continued)

(52) U.S. Cl.
CPC ........... *H01Q 1/2291* (2013.01); *H01Q 1/243* (2013.01); *H01Q 1/48* (2013.01); *H01Q 9/0421* (2013.01); *H01Q 9/40* (2013.01); *H01Q 13/10* (2013.01); *H04B 1/40* (2013.01)

(58) Field of Classification Search
CPC ........ H01Q 1/2291; H01Q 1/243; H01Q 1/48; H01Q 9/0421; H04B 1/40
See application file for complete search history.

(56) References Cited

U.S. PATENT DOCUMENTS

| 9,093,740 B2 * | 7/2015 | Barratt | ................... H01Q 1/243 |
| 9,184,494 B1 * | 11/2015 | Liu | ........................... H04L 25/02 |
| 9,698,739 B2 * | 7/2017 | Young | ...................... H03H 7/40 |

(Continued)

FOREIGN PATENT DOCUMENTS

| CN | 101540621 A | 9/2009 |
| CN | 104205486 A | 12/2014 |
| CN | 104218319 A | 12/2014 |

*Primary Examiner* — Tho G Phan
(74) *Attorney, Agent, or Firm* — CKC & Partners Co., Ltd.

(57) ABSTRACT

A wireless communication circuit and an electronic device are provided. The wireless communication circuit used for an electronic device includes a wireless transceiver unit used to generate a transmitting signal, an impedance matching unit electronically coupled to the wireless transceiver unit, a coupling unit and a system grounding surface. The impedance matching unit includes at least one impedance, the impedance matching unit is used to convert the transmitting signal to a feeding signal according to the impedance value of at least one impedance. The coupling unit is electronically coupled to the impedance matching unit, to radiate the energy of the feeding signal. The system grounding surface is used to transmit a first electromagnetic wave signal via resonance on the plane of the system grounding surface after receiving the energy of the feeding signal.

12 Claims, 10 Drawing Sheets

(51) Int. Cl.
*H01Q 9/40* (2006.01)
*H01Q 13/10* (2006.01)

(56) References Cited

U.S. PATENT DOCUMENTS

| | | | |
|---|---|---|---|
| 9,698,854 B2* | 7/2017 | Mow | H04B 1/40 |
| 2010/0207832 A1* | 8/2010 | Ying | H01Q 9/0407 |
| | | | 343/749 |
| 2014/0253392 A1 | 9/2014 | Yarga et al. | |
| 2014/0266922 A1 | 9/2014 | Jin et al. | |
| 2015/0026754 A1 | 1/2015 | Girard | |

\* cited by examiner

120a

120b

120c

WIRELESS COMMUNICATION CIRCUIT AND ELECTRONIC DEVICE

CROSS-REFERENCE TO RELATED APPLICATION

This application claims the priority benefit of China application serial No. 201610018466.3, filed on Jan. 12, 2016. The entirety of the above-mentioned patent application is hereby incorporated by references herein and made a part of specification.

BACKGROUND OF THE INVENTION

Field of the Invention

The disclosure relates to a wireless communication circuit and an electronic device.

Description of the Related Art

A planar inverted-F antenna (PIFA) is a common antenna in a handheld device. The Planar Inverted-F Antenna radiates or receives electromagnetic waves via resonance current on the antenna alignment. Therefore, the resonance current is limited in the area of the antenna alignment, thus the antenna efficiency is limited. And the lowest operating frequency of the Planar Inverted-F Antenna (PIFA) is also limited.

BRIEF SUMMARY OF THE INVENTION

According to an aspect of the present disclosure, a wireless communication circuit used for an electronic device is provided. The wireless communication circuit includes: a wireless transceiver unit configured to generate a transmitting signal; an impedance matching unit electronically coupled to the wireless transceiver unit, the impedance matching unit includes at least one impedance, the impedance matching unit is configured to convert the transmitting signal to a feeding signal according to an impedance value of the impedance; a coupling unit disposed on a first surface of the electronic device and electronically coupled to the impedance matching unit, configured to radiate energy of the feeding signal, and a system grounding surface configured to receive energy of the feeding signal and transmit a first electromagnetic wave signal via resonance.

According to another aspect of the present disclosure, an electronic device is provided. The electronic device includes a wireless communication circuit, the wireless communication circuit comprises a wireless transceiver unit configured to generate a transmitting signal; an impedance matching unit electronically coupled to the wireless transceiver, the impedance matching unit includes at least one impedance, the impedance matching unit is configured to convert the transmitting signal to a feeding signal according to an impedance value of the impedance; a coupling unit disposed on a first surface of the electronic device and electronically coupled to the impedance matching unit, configured to radiate energy of the feeding signal, and a system grounding surface configured to receive energy of the feeding signal and transmit a first electromagnetic wave signal via resonance; a storage circuit configured to store a plurality of frequency band data; and a calculating circuit electronically coupled to the storage circuit and the impedance matching unit, configured to generate a control signal according to the frequency band data to adjust the impedance value of the at least one impedance of the impedance matching unit.

As mentioned above, by disposing the coupling unit on the surface of the electronic device, the interference generated by the other metal structures or metal components inside the electronic device is avoided, the transmission efficient of the antenna is further improved when the wireless communication transmits or receives the electromagnetic wave signal via resonance on the plane of the system grounding surface. In some embodiments, the operating frequency is adjusted in real time via an induced circuit and a feedback circuit to reduce the signal reflection.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

The term "connected" represents that two or more components are contacted physically or electronically, and the contact therebetween may be direct or indirect, and it also represents that two or more components communicate, operate or act with each other, which is not limited herein. "The first", "the second" and so on are only used to distinguish components or operations with same technical terms but not used to limit the order.

Figure 1:
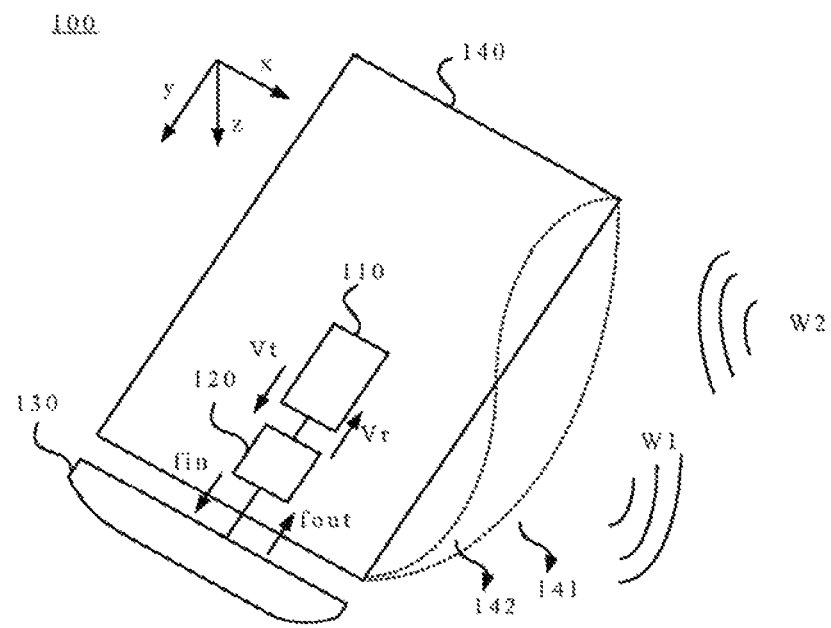
FIG. 1 is a schematic view of a wireless communication circuit according to an embodiment.

Please refer to FIG. 1, which is a schematic view of a wireless communication circuit 100 according to an embodiment. The wireless communication circuit 100 is used to an electronic device, in an embodiment, the electronic device is a cell phone, a tablet computer, a notebook or any other electronic devices with a wireless communication function. A cell phone is taken as an example in the following embodiments. As shown in FIG. 1, the wireless communication circuit 100 includes a wireless transceiver unit 110, an impedance matching unit 120, a coupling unit 130 and a system grounding surface 140.

In this embodiment, the wireless transceiver unit 110 is used to generate a transmitting signal Vt. The impedance matching unit 120 is electronically coupled to the wireless transceiver unit 110, the impedance matching unit 120 includes at least one impedance, the impedance matching unit 120 is used to convert the transmitting signal Vt to a feeding signal fin according to an impedance value of at least one impedance. The coupling unit 130 is disposed on the at least one first surface of the electronic device and electronically coupled to the impedance matching unit 120, to radiate energy of the feeding signal fin. The system grounding surface 140 is used to transmit a first electromagnetic wave signal W1 via resonance on the plane of the system grounding surface 140 after receiving the energy of the feeding signal fin.

In an embodiment, the coupling unit 130 is a metal plate, a metal film, a metal coating or another conductive metal element disposed on the surface of the electronic device in embodiments. The system grounding surface 140 has a major axis (y axis direction in FIG. 1) and a minor axis (x axis direction in FIG. 1), the coupling unit 130 and the system grounding surface 140 are arranged separately from each other, the coupling unit 130 roughly extends along the minor axis of the system grounding surface 140. Please refer to FIG. 2A-2F, which are schematic views of an electronic device 200a~200f according to an embodiment, respectively. Each one of the electronic device 200a to 200f includes the wireless transceiver unit 110 and the impedance matching unit 120 of the wireless communication circuit 100. The difference is that the coupling units 130a~130f are disposed at different positions of the electronic device 200a~200f, respectively.

Figure 2A:
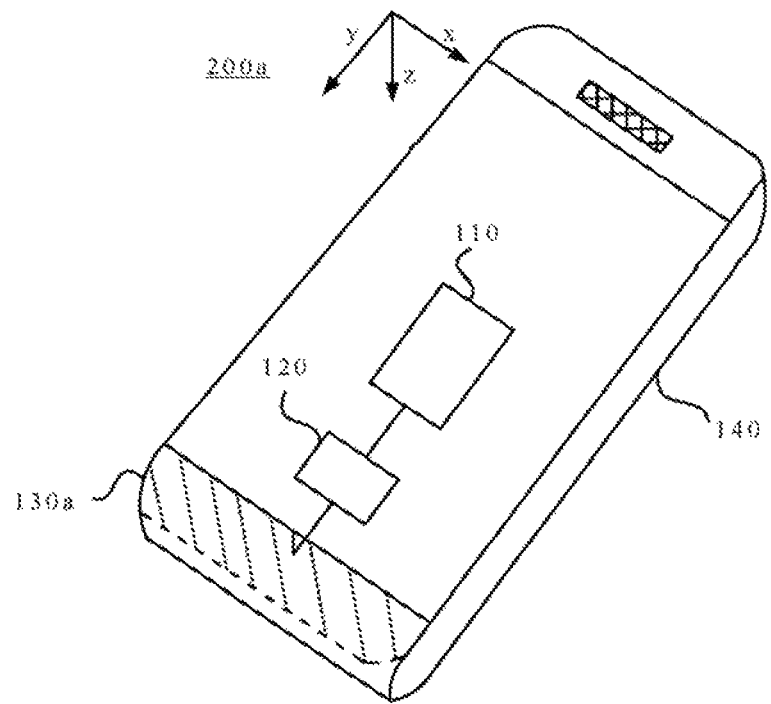
FIG. 2A is a schematic view of an electronic device according to an embodiment.
Figure 2B:
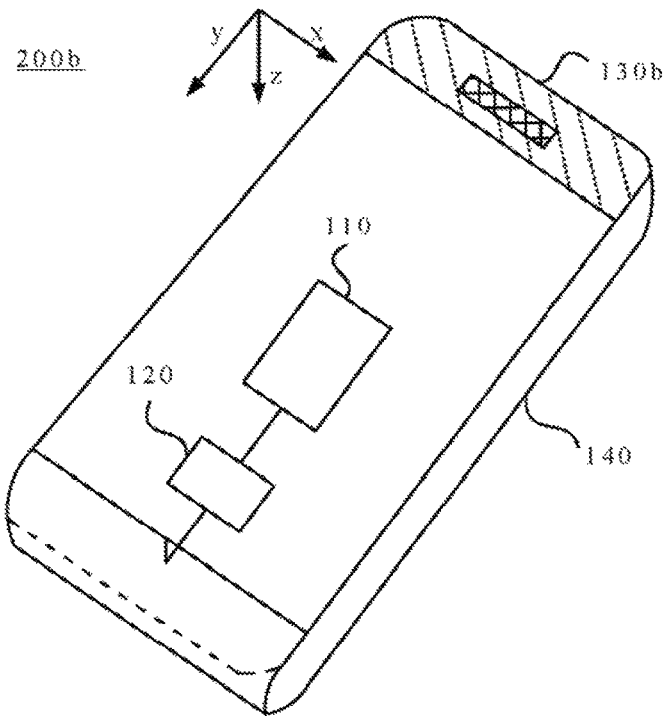
FIG. 2B is a schematic view of an electronic device according to an embodiment.
Figure 2C:
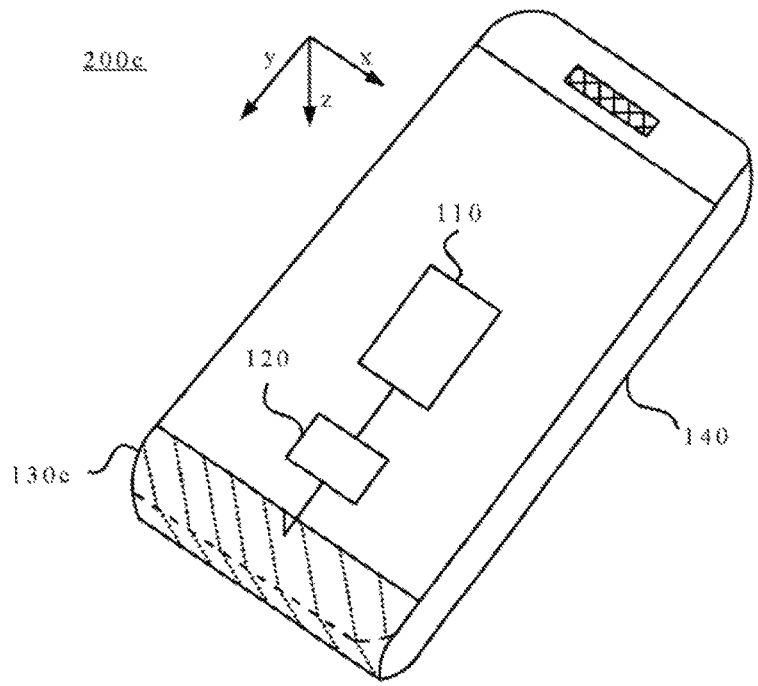
FIG. 2C is a schematic view of an electronic device according to an embodiment.

In FIG. 2A, the coupling unit 130a is disposed at the bottom of an outer cover of the electronic device 200a. In FIG. 2B, the coupling unit 130b is disposed at upper of the outer cover of the electronic device 200b. The coupling unit 130a folds and extends along different directions in different embodiments. In FIG. 2C, the coupling unit 130c is disposed at the bottom of the outer cover of the electronic device 200c, and the coupling unit 130c further folds downwardly (folds toward to direction z) and extends to the side surface of the outer surface to form an L-shape element.

Figure 2D:
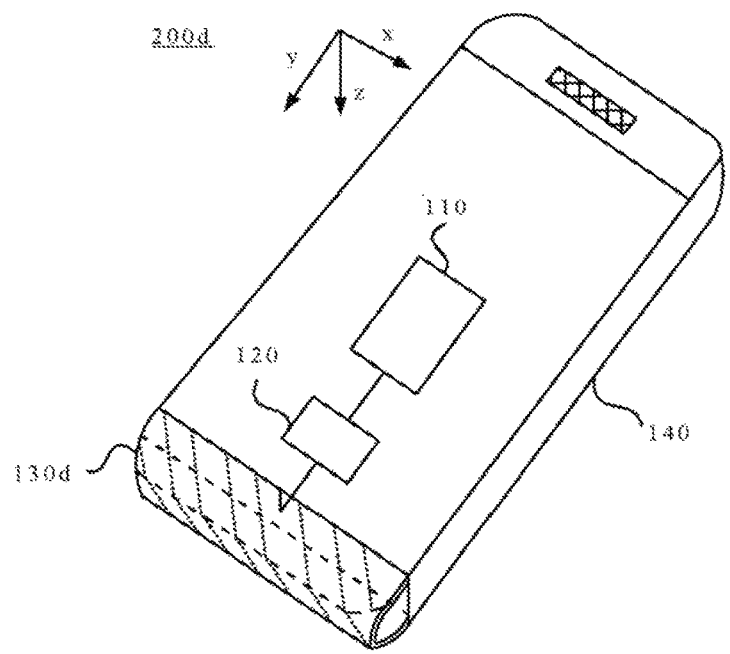
FIG. 2D is a schematic view of an electronic device according to an embodiment.

In some embodiments, the number of times that the coupling unit folds and extends along different directions is more than one. In FIG. 2D, the coupling unit 130d is configured at the bottom of the outer cover of the electronic device 200d, and it folds downwardly one time and extends, and then further folds inwardly one time and extends. That is, the coupling unit 130d folds toward z axis direction and then folds toward −y direction. As a result, the coupling unit 130 covers the bottom, the bottom side surface and the bottom back surface of the outer cover of the electronic device 200d, to form a C-shape element.

Figure 2E:
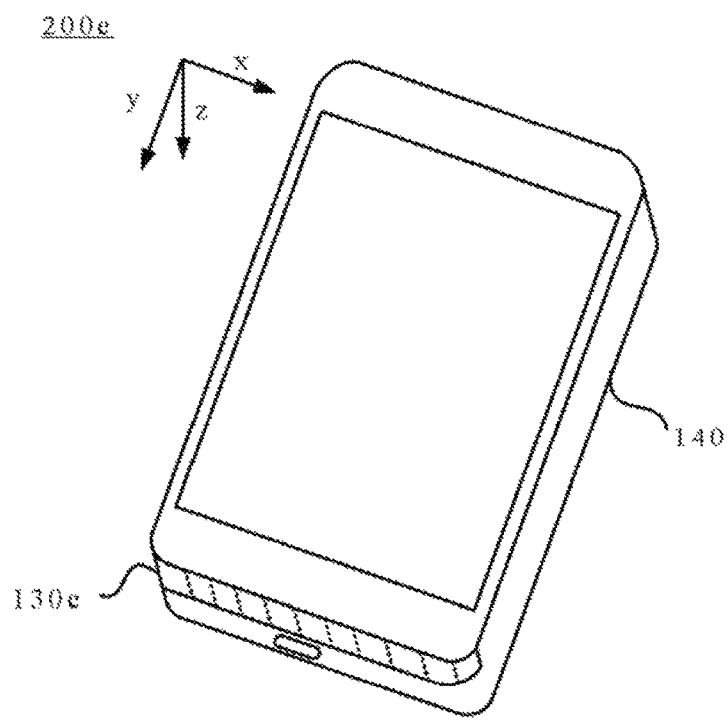
FIG. 2E is a schematic view of an electronic device according to an embodiment.
Figure 2F:
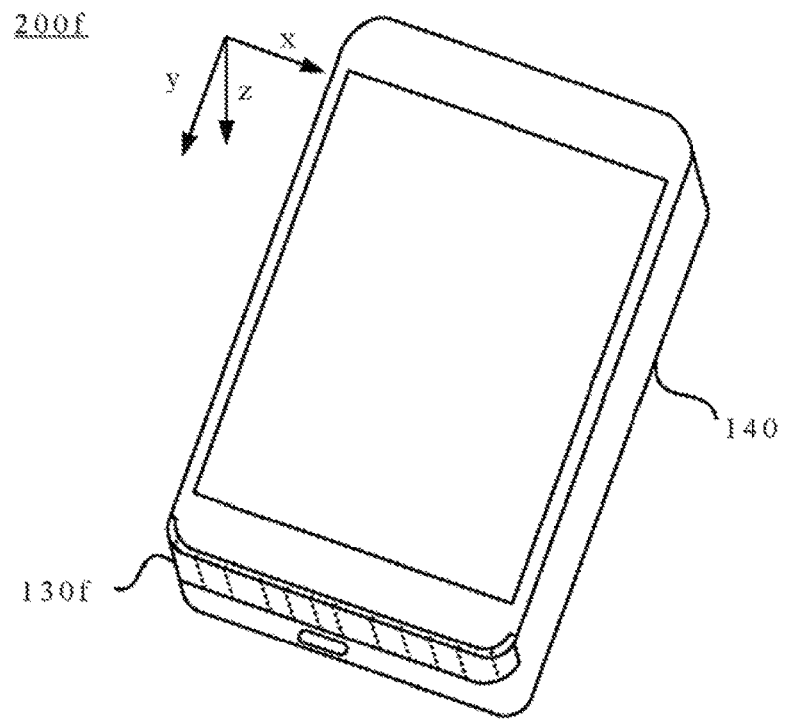
FIG. 2F is a schematic view of an electronic device according to an embodiment.

In some embodiments, the coupling unit 130 is disposed on the side surface of the electronic device. In FIG. 2E, the coupling unit 130e is disposed at the bottom side surface of the outer cover of the electronic device 200E. In an embodiment, the coupling unit 130e is folded, as shown in FIG. 2F, the coupling unit 130f is disposed at the bottom side surface of the outer cover of the electronic device 200f, and it folds toward to −y direction and extends to the outer cover to form an L-shape element.

In above embodiments, all of the coupling units 130a~130f are arranged separately from the system grounding surface 140. That is, the coupling units 130a~130f are not electronically coupled to the system grounding surface 140. In an embodiment, the plastic or other non-conductive materials is disposed in the intervals between the coupling units 130a~130f and the system grounding surface 140. And the coupling units 130a~130f extends along the minor axis of the system grounding surface 140.

Figure 3A:
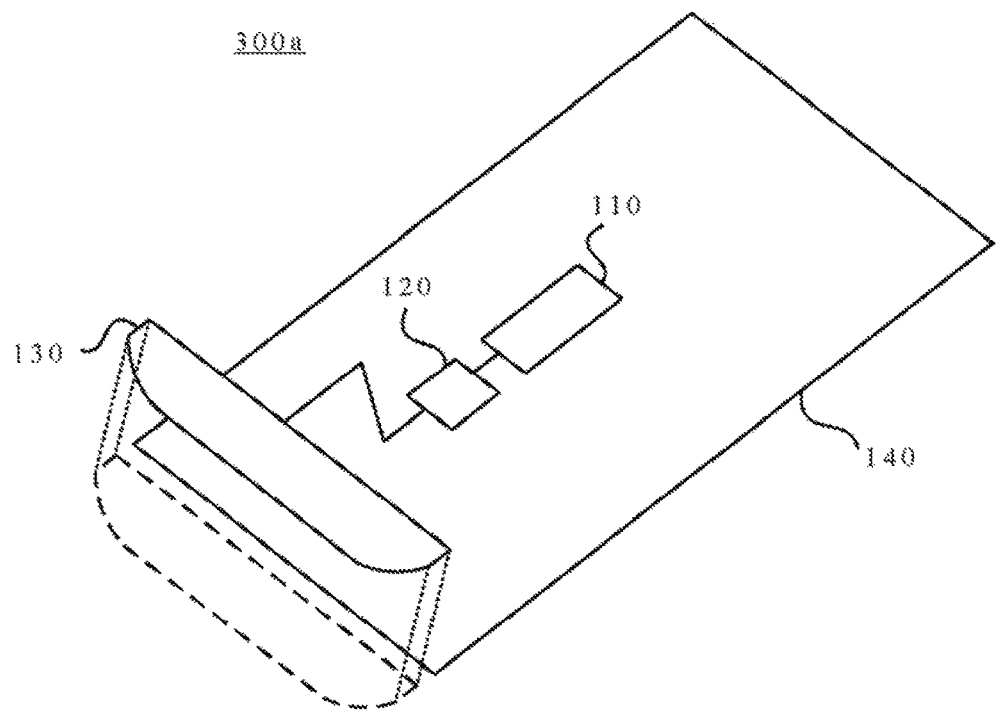
FIG. 3A is a schematic view of a wireless communication circuit according to an embodiment.
Figure 3B:
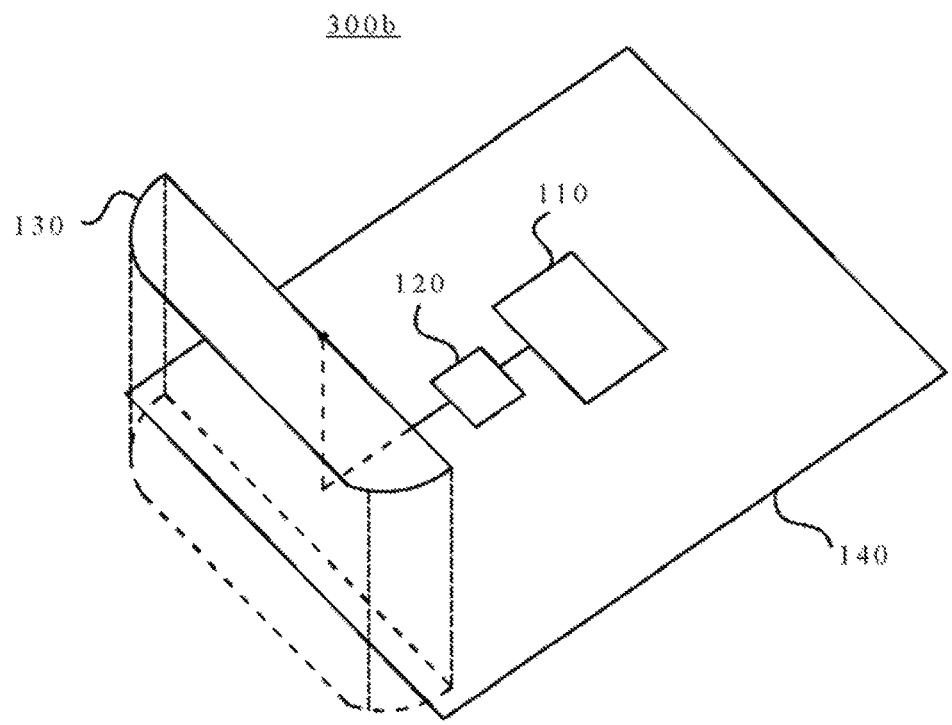
FIG. 3B is a schematic view of a wireless communication circuit according to an embodiment.

In an embodiment, in FIG. 2A~2F, the projection of the coupling unit 130a~130f on the normal of the system grounding surface 140 may overlap or may not overlap with the system grounding surface 140 in different embodiments. Please also refer to FIG. 3A and FIG. 3B. FIG. 3A is a schematic view of a wireless communication circuit 300a according to an embodiment. FIG. 3B is a schematic view of a wireless communication circuit 300b according to an embodiment. As shown in FIG. 3A, the projection of the coupling unit 130 in the wireless communication circuit 300a along the z axis direction does not overlap with the system grounding surface 140. As shown in FIG. 3B, the projection of the coupling unit 130 in the wireless communication circuit 300b along the z axis direction partially overlaps with the system grounding surface 140. Comparing to the wireless communication circuit 300a in FIG. 3A, the capacitive impedance between the coupling unit 130 and the system grounding surface 140 of the wireless communication circuit 300b in FIG. 3B is increased. Consequently, when the imaginary parts of the impedance of the impedance matching unit 120 is inductive, the whole imaginary parts of the impedance of the wireless communication circuit is reduced, and the impedance of the wireless communication circuit can be compensated to improve the matching effect. The imaginary parts of the impedance of the impedance matching unit will be further illustrated in the following with the curve in FIG. 5D.

Figure 3C:
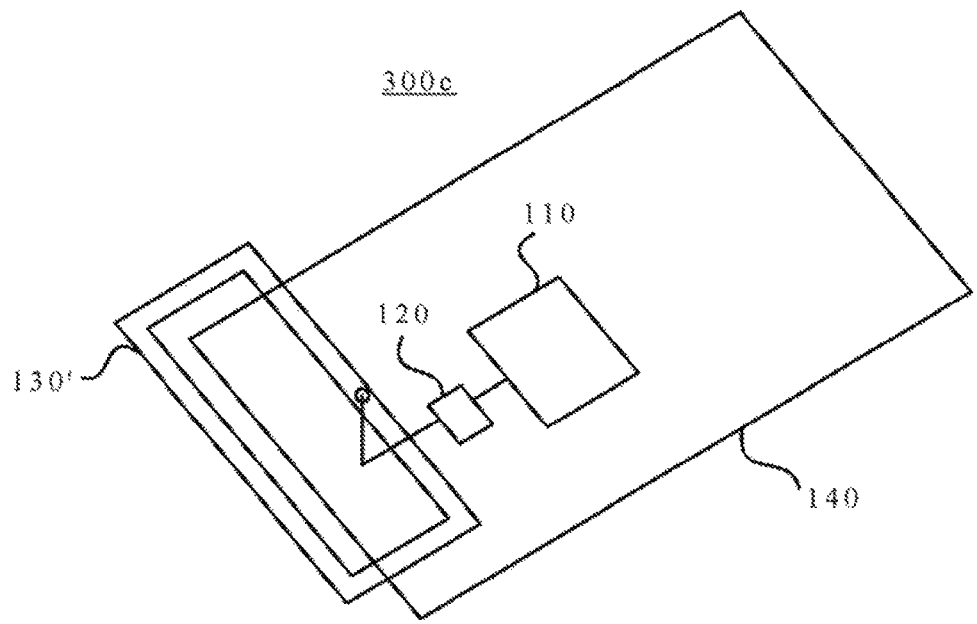
FIG. 3C is a schematic view of a wireless communication circuit according to an embodiment.

In some embodiments, the coupling unit includes at least one slot hole, please also refer to FIG. 3C. FIG. 3C is a schematic view of a wireless communication circuit 300c according to an embodiment. A slot hole is formed at the center of the coupling unit 130' of the wireless communication circuit 300c, that is, the center is hollow.

Figure 4A:
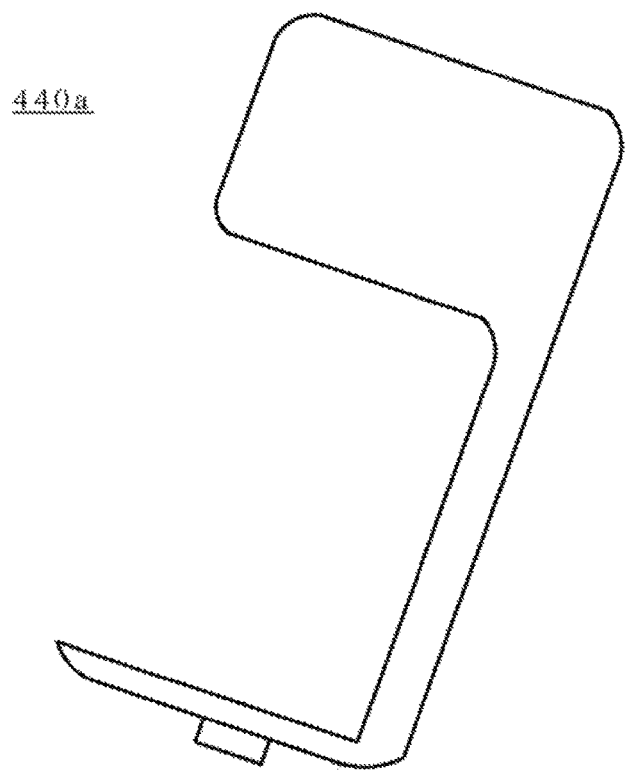
FIG. 4A is a schematic view of a system grounding surface according to an embodiment.
Figure 4B:
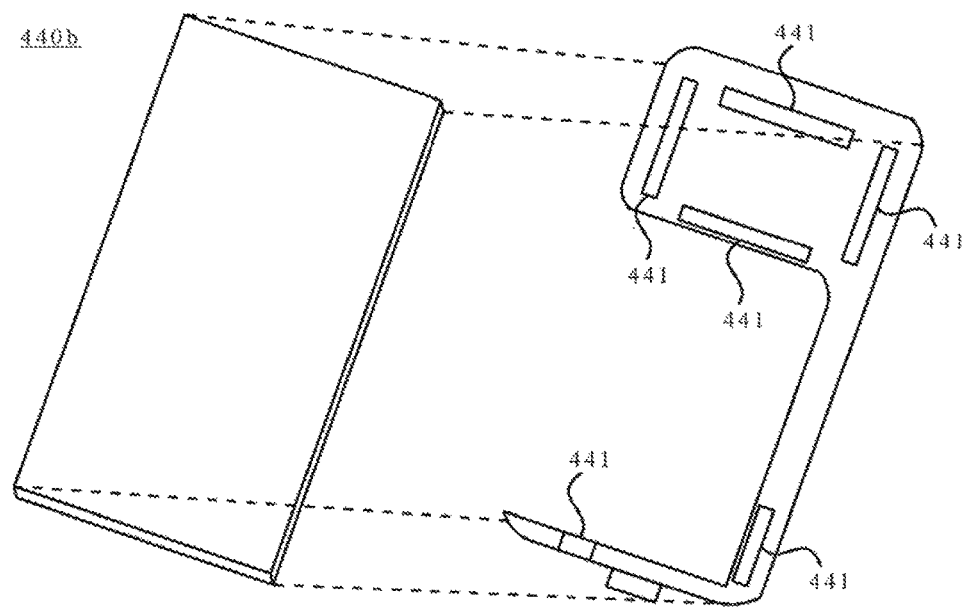
FIG. 4B is a schematic view of a system grounding surface according to an embodiment.

In addition, the system grounding surface 140 in the embodiments of the FIG. 2A~2F are the metal back covers of the electronic devices 200a~200f. That is, the metal back cover as showed in FIG. 2A to FIG. 2F is disposed on the second surface of the electronic devices 200a~200f (the second surface is a back surface of the outer cover of the electronic devices 200a~200f). In some embodiments, the system grounding surface 140 is a Printed Circuit Board (PCB), the wireless transceiver unit 110 and the impedance matching unit 120 are disposed on the Printed Circuit Board. For example, FIG. 4A is a schematic view of a system grounding surface according to an embodiment. In FIG. 4, the system grounding surface 440a is a print circuit board, and the wireless transceiver unit 110 and the impedance matching unit 120 are disposed on the print circuit board (not shown). In an embodiment, the system grounding surface includes both a metal back cover and a print circuit board of the electronic device, and the metal back cover and the print circuit board are electronically coupled to each other, as shown in FIG. 4B, FIG. 4B is a schematic view of a system grounding surface 440b according to an embodiment, the system grounding surface 440b both includes a metal back cover and a print circuit board, the metal back cover and the print circuit board are electronically coupled to each other via a conductive buffer gasket 441. In the following embodiments, the metal back cover is a system grounding system, but the disclosure is not limited herein.

Figure 5A:
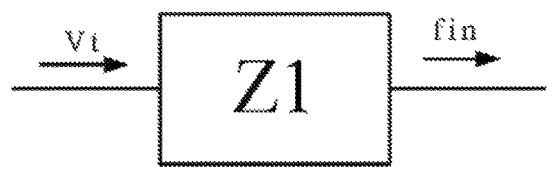
FIG. 5A is a schematic view of an impedance matching unit according to an embodiment.
Figure 5B:
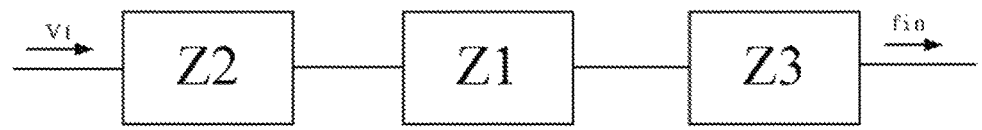
FIG. 5B is a schematic view of an impedance matching unit according to an embodiment.
Figure 5C:
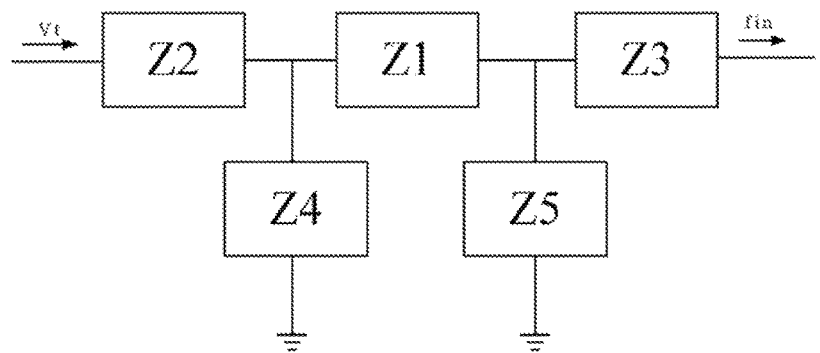
FIG. 5C is a schematic view of an impedance matching unit according to an embodiment.

In the process of the wireless communication circuit 100 transmitting the first electromagnetic wave signal W1, please refer to FIG. 1, at first, the wireless transceiver unit 110 generates a transmitting signal Vt. In an embodiment, the transmitting signal Vt includes voice information, image information or film information. In general, when the frequency of the signal is at high-frequency, if the particular impedance of the transmission lines is not equal to (that is, not match) the load impedance, the signal reflection is generated at the load side. Therefore, in this embodiment, in order to achieve the minimum signal reflection (that is, the lowest reflection coefficient (S11)), the transmitting signal Vt is convened to a feeding signal fin via the impedance value of at least one impedance inside the impedance matching unit 120. FIG. 5A~5C are schematic views of an impedance matching unit 120a~120c according to an embodiment, respectively.

In an embodiment, the impedance matching unit only includes a single impedance, as shown in FIG. 5A, the impedance matching unit 120a only includes a first impedance Z1, a first end of the first impedance Z1 is used to receive the transmitting signal Vt, a second end of the first impedance Z1 is used to output the feeding signal fin. In some embodiments, the impedance matching unit includes a plurality of impedances, as shown in FIG. 5B, the impedance matching unit 120b further includes a second impedance Z2 and a third impedance Z3, the second impedance Z2 is electronically coupled between the first end of the first impedance Z1 and the wireless transceiver unit 110, the third impedance Z3 is electronically coupled between the second end of the first impedance Z1 and the coupling unit 130. In an embodiment, as shown in FIG. 5C, except for the first impedance Z1, the second impedance Z2 and the third impedance Z3, the impedance matching unit 120b further includes a fourth impedance Z4 and a fifth impedance Z5, a first end of the fourth impedance Z4 is electronically coupled to the first end of the first impedance Z1 and the second end of the second impedance Z2, a second end of the fourth impedance Z4 is electronically coupled to a signal grounding point, a first end of the fifth impedance Z5 is electronically coupled to the second end of the first impedance Z1 and the first end of the third impedance Z3, a second end of the fifth impedance Z5 is electronically coupled to the signal grounding point to form a π-type circuit. In an embodiment, the impedance matching units are connected in parallel or in series, and the number of the impedance is different in embodiments. In an embodiment, the impedance in the impedance matching unit is a capacitor or an inductor. Taking FIG. 5C for example, the first impedance Z1 is a capacitor of 0.7 pF, the second impedance Z2 is an inductor of 1.3 nH, the third impedance Z3 is a capacitor of 0.5 pF, the fourth impedance Z4 is a capacitor of 0.1 pF, the fifth impedance Z5 is an inductor of 5.1 nH, the value of the impedances is determined according to different operating frequencies, which is not limited to the above values.

Figure 5D:
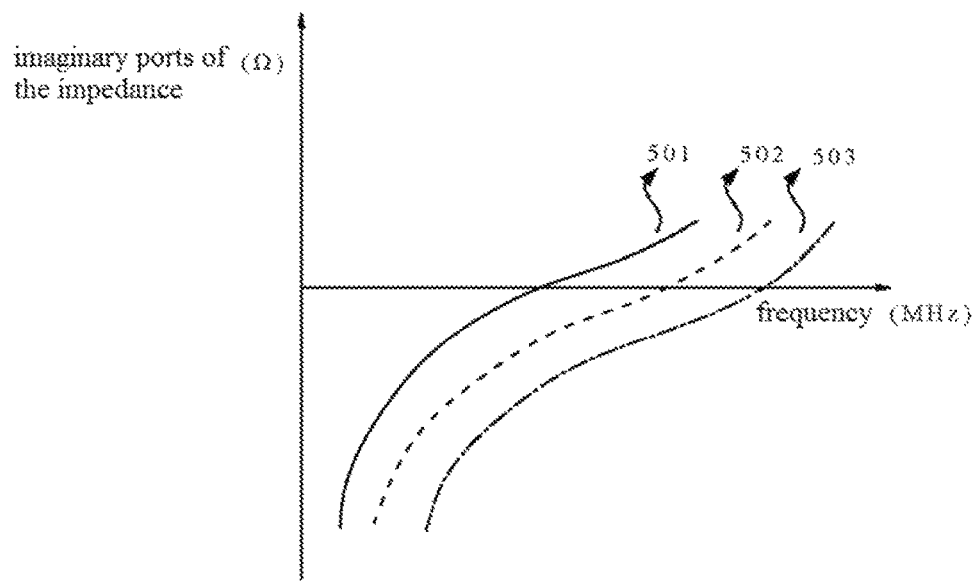
FIG. 5D is a schematic view showing the frequency corresponding to imaginary parts of the impedance of the impedance matching unit in FIG. 5C.

Please refer to FIG. 5D. FIG. 5D is a schematic view showing the frequency corresponding to imaginary parts of the impedance of the impedance matching unit 120c in FIG. 5C. As shown in FIG. 5D, curves 501~503 respectively represent the conditions of the frequency corresponding to the imaginary parts of the impedance with different impedance values. In an embodiment, a curve 501 corresponds a condition when the first impedance Z1, the second impedance Z2, the third impedance Z3, the fourth impedance Z4 and the fifth impedance Z5 of the impedance matching unit 120c have the values of the above embodiment (the values are shown in the above paragraph), a curve 502 corresponds a condition that the capacitance of the third impedance Z3 is 0.3 pF, but not 0.5 pF, while other values are the same as that in the embodiment of the above paragraph, a curve 503 corresponds a condition that the capacitance of the third impedance Z3 is 0.3 pF (instead of 0.5 pF) and the capacitance of the fourth impedance Z4 is 0.2 pF (instead of 0.1 pF) while other values are the same as that in the embodiment of the above paragraph. From the curve 501 to the curve 503, the curves translate to right gradually, that is, the operating frequency gradually increases. As a result, different impedance values are selected according to different operating frequency to compensate for the whole imaginary parts of the impedance of the wireless communication circuit, and then the matching effect is good under different operating frequency.

In an embodiment, the number of the wireless transceiver unit 110 and the impedance matching unit 120 of the wireless communication circuit 100 is more than one to process the signals of different operating frequencies.

Figure 5E:
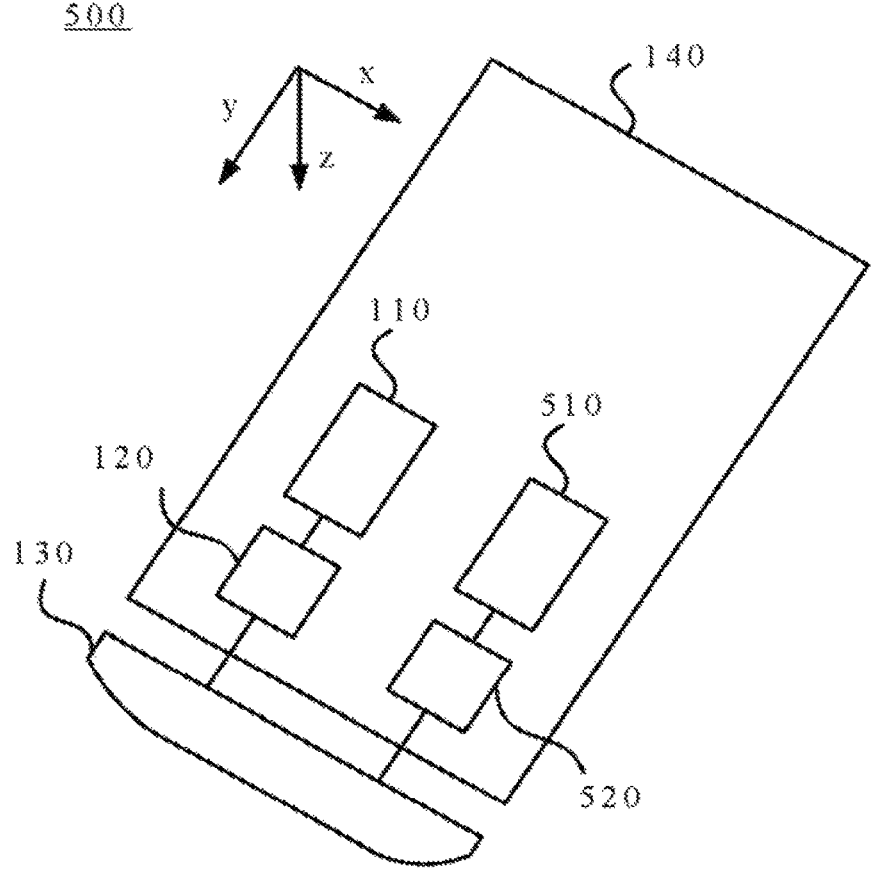
FIG. 5E is a schematic view of a wireless communication circuit according to an embodiment.

FIG. 5E is a schematic view of a wireless communication circuit 500 according to an embodiment. As shown in FIG. 5E, comparing to the wireless communication circuit 100, the wireless communication circuit 500 further includes a wireless transceiver unit 510 and an impedance matching unit 520. In an embodiment, the wireless transceiver unit 110 and the impedance matching unit 120 process the signal of low frequency band, and the wireless transceiver unit 510 and the impedance matching unit 520 process the signal of high frequency band. In an embodiment, the wireless communication circuit includes more wireless transceiver units and impedance matching units, but the disclosure is not limited herein.

Please refer to FIG. 1, the coupling unit 130 is electronically coupled to the impedance matching unit 120, the coupling unit 130 radiates the energy of the feeding signal fin to the system grounding surface 140. The coupling unit 130 is coupled to the impedance matching unit 120 via a conductor (such as a metal elastic piece, metal spring contacts or screws). The system grounding surface 140 transmits the first electromagnetic wave signal W1 via resonance on the plane of the system grounding surface 140 after receiving the energy of the feeding signal fin.

After the system grounding surface 140 receives the energy of the feeding signal fin, the system grounding surface 140 generates a dominant mode resonant current and a subdominant mode resonant current along the major axis (y axis direction), the amplitude of the dominant mode resonant current and the subdominant mode resonant current is shown in a curve 141 and a curve 142 in FIG. 1, respectively, which is not limited herein. In an embodiment, except for the first level subdominant mode resonant current, the curve 142 of the subdominant mode resonant current further includes a second level subdominant mode resonant current, a third level subdominant mode resonant current . . . and so on, and the intensity of the resonant currents is changed corresponding with the shape and the position of the coupling unit. Since the dominant mode resonant current and the subdominant mode resonant current are formed on the whole plane of the system grounding surface 140, but not a resonant current of a small area, which improves the efficiency of transmitting the first electromagnetic wave signal W1.

The wireless communication circuit 100 in FIG. 1 is used to receive the electromagnetic wave signal, that is, the system grounding surface 140 is used to receive a second electromagnetic wave signal W2 and radiate the energy of the second electromagnetic wave signal W2 to the coupling unit 130 via resonance on the plane of the system grounding surface 140, the coupling unit 130 is further used to receive the energy of the second electromagnetic wave signal W2 and generate an outputting signal fout to the impedance matching unit 120, the impedance matching unit 120 is further used to convert the outputting signal fout to a receiving signal Vr according to the impedance value of at least one impedance to transmit to the wireless transceiver unit 110. The details about receiving the second electromagnetic wave signal W2 is similar to the description of transmitting the electromagnetic wave signal W1, for example, after the system grounding surface 140 receives the second electromagnetic wave signal W2, the system grounding surface 140 generates a dominant mode resonant current and a subdominant mode resonant current along the major axis (y axis direction), and generates the outputting signal fout via the coupling unit 130, then, the outputting signal fout is converted to the receiving signal Vr via the impedance matching unit 120, the description can refer above, which is not repeated herein. By disposing the coupling unit 130 on the surface of the electronic device, the interference from other metal structures or metal components inside the electronic device is avoided, furthermore, since the wireless communication transmits or receives the electromagnetic wave via resonance on the plane of the system grounding surface, the transmission efficient of the antenna is further improved.

Figure 6A:
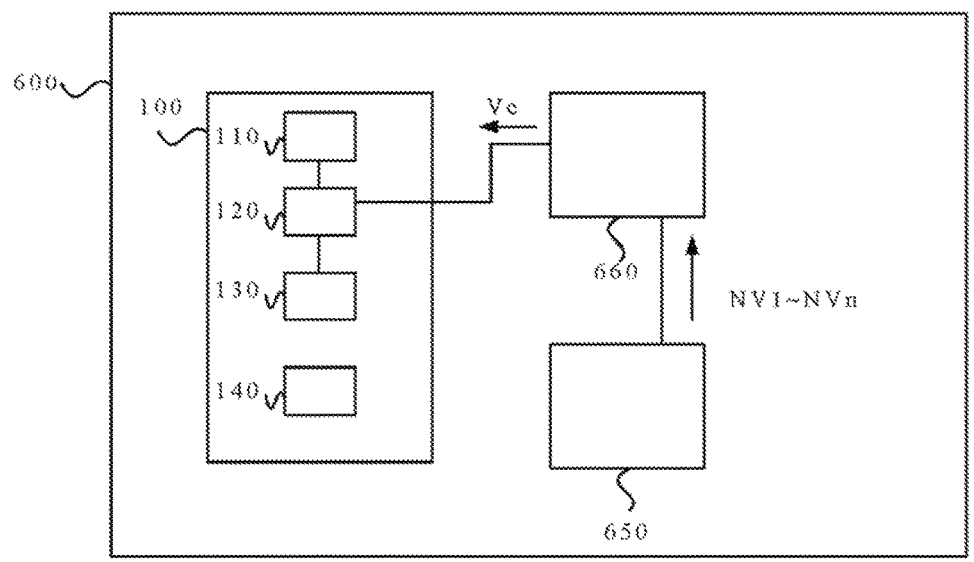
FIG. 6A is a schematic view of an electronic device according to an embodiment.

FIG. 6A is a schematic view of an electronic device 600 according to an embodiment. Except for the wireless communication circuit 100, the electronic device 600 further includes a storage circuit 650 and a calculating circuit 660. The storage circuit 650 is used to store the frequency band data NV1~NVn. The calculating circuit 660 is electronically coupled to the storage circuit 650 and the impedance matching unit 120 to generate a control signal Vc according to the frequency band data NV1~NVn to adjust the impedance value of at least one impedance of the impedance matching unit 120.

In an embodiment, the storage circuit 650 is a nonvolatile memory (such as a read-only memory and a flash), a volatile memory (such as a static random access memory and a dynamic random access memory) or other memories, the calculating circuit 660 is a Central Processing Unit (CPU), an Arithmetic Logic Unit (ALU) or any logic unit with a function of logic operation, which is not limited herein. As above, when the impedance matching unit 120 has different impedance values, the operating frequency of the wireless communication circuit 100 is also changed, consequently, in this embodiment, the frequency band data NV1~NVn stored in the storage circuit 650 is the impedance values of the impedance matching unit 120 corresponding to different operating frequencies, and the calculating circuit 660 generates the control signal Vc according to the frequency band data NV1~NVn to adjust the impedance value of at least one impedance of the impedance matching unit 120.

Figure 6B:
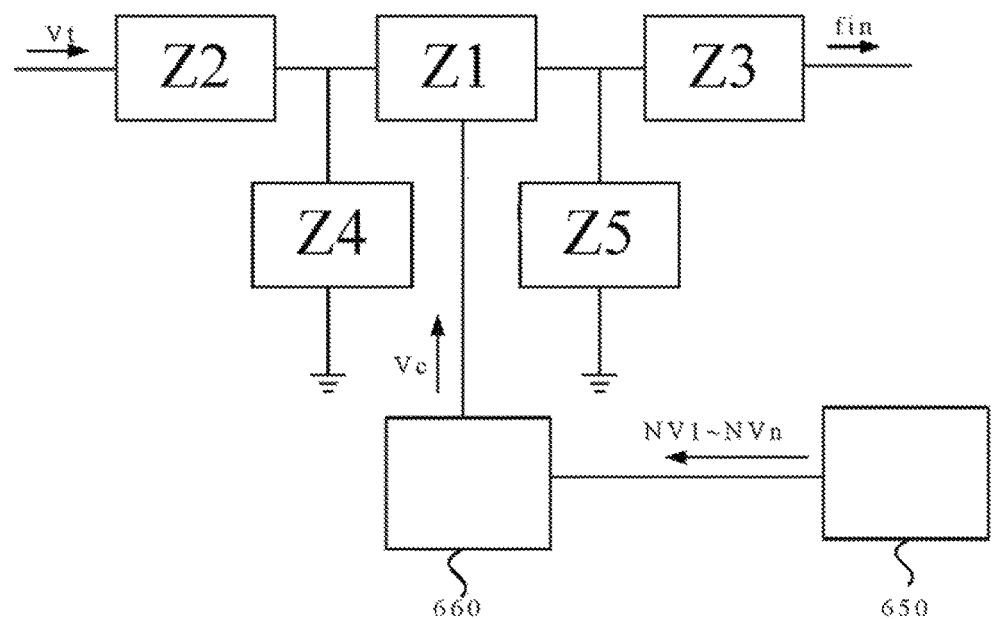
FIG. 6B is a schematic view showing the operation of the electronic device in FIG. 6A.

FIG. 6B is a schematic view showing the operation of the electronic device 600 in FIG. 6A. The impedance matching unit 120c is taken as an example, however, in other embodiment, the impedance matching unit is the impedance matching unit 120a or 120b or other impedance matching unit with other impedance configurations, which is not limited herein. In an embodiment, the frequency band data NV1~NVn corresponds to the operating frequency from low to high, respectively, the calculating circuit 660 is electronically coupled to the first impedance Z1. When the calculating circuit 660 receives the frequency band data NV1 corresponding to the lower operating frequency, the control signal Vc generated by the calculating circuit 660 adjusts the impedance value of the first impedance Z1 correspondingly, for example, by increasing the capacitance value, to make the first impedance Z1 correspond to the lower operating frequency. In an embodiment, when the calculating circuit 660 receives the frequency band data NVn corresponding to a higher operating frequency, the control signal Vc generated by the calculating circuit 660 adjusts the impedance value of the first impedance Z1 correspondingly, for example, by reducing the capacitance value, to make the first impedance Z1 corresponding to the higher operating frequency. In an embodiment, the calculating circuit 660 is electronically coupled to other impedances, or electronically coupled to a plurality of impedances simultaneously to adjust the impedance values, the disclosure is not limited herein.

Figure 7A:
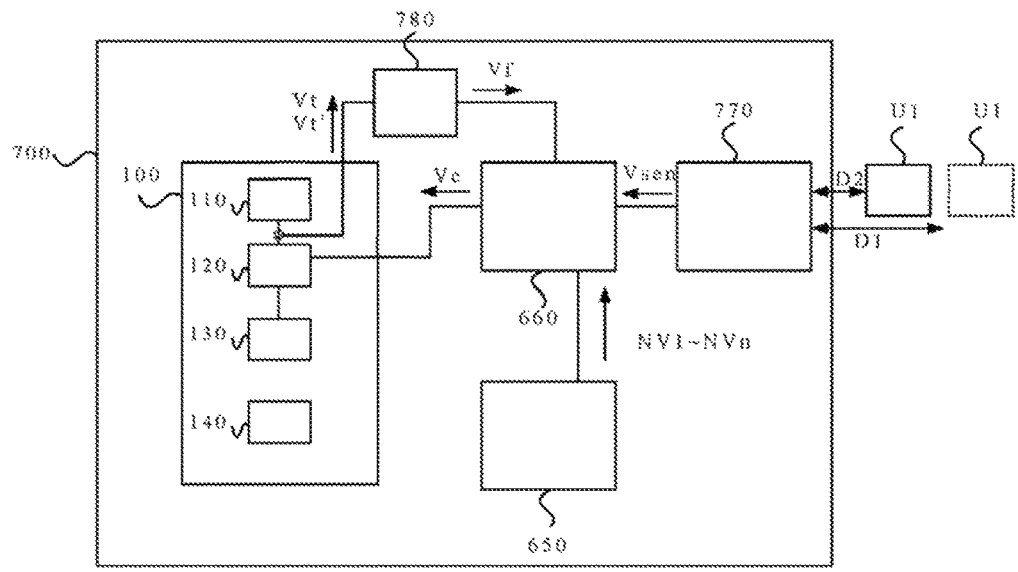
FIG. 7A is a schematic view of an electronic device according to an embodiment.

In some embodiments, the transmission efficiency of the wireless communication circuit is affected when a user or other charged objects are close to the electronic device. Thus, in some embodiments, the electronic device further includes an induced circuit. FIG. 7A is a schematic view of an electronic device 700 according to an embodiment. As shown in FIG. 7A, comparing to the electronic device 600, the electronic device 700 further includes an induced circuit 770 and a feedback circuit 780, the induced circuit 770 and the feedback circuit 780 are electronically coupled to the calculating circuit 660, the induced circuit 770 is used to detect the distance between the user U1 and the electronic device 700 to generate an inductive signal Vsen, the feedback circuit 780 is used to generate a feedback signal Vf according to the transmitting signal Vt and the corresponding reflecting signal Vt', the calculating circuit 660 is further used to generate a control signal Vc according to the inductive signal Vsen and the feedback signal Vf.

Figure 7B:
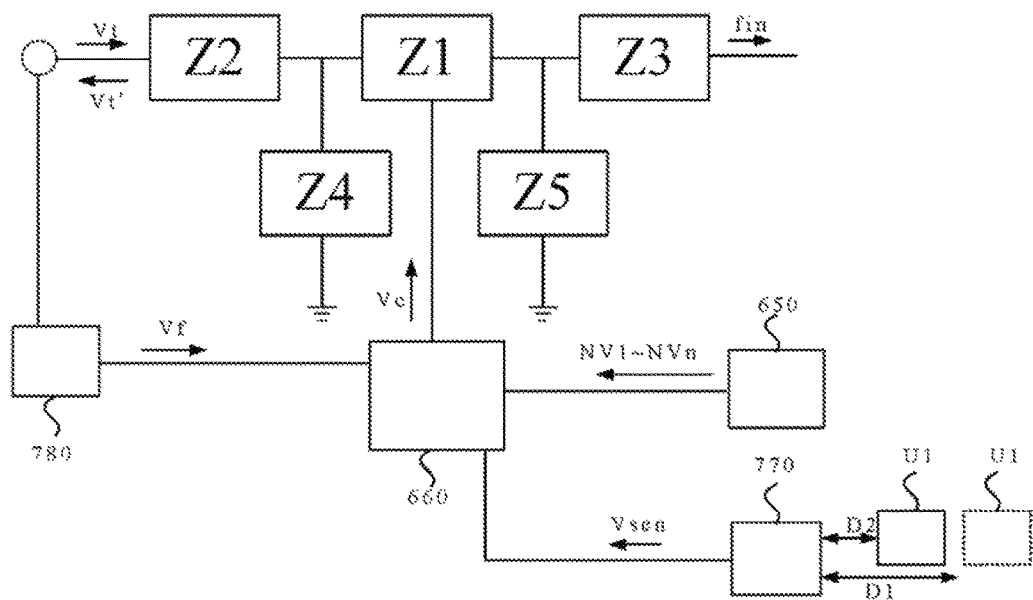
FIG. 7B is a schematic view showing the operation of the electronic device in FIG. 7A.

FIG. 7B is a schematic view showing the operation of the electronic device 700 in FIG. 7A. As shown in FIG. 7B, when the distance between the user U1 and the electronic device is reduced from D1 to D2, the inductive signal Vsen generated by the induced circuit 770 is also adjusted according to the different distances. In an embodiment, the electric potential of the inductive signal Vsen corresponding to the distance D1 is lower, and the electric potential of the inductive signal Vsen corresponding to the distance D2 is higher. Consequently, in an embodiment, when the calculating circuit 660 receives the inductive signal Vsen generated according to the different distances, the impedance value of the first impedance Z1 is further adjusted, for example, the capacitance value is further reduced. On other hand, the feedback circuit 780 couples the reflecting signal Vt' and generates the feedback signal Vf to the calculating circuit 660, that is, the feedback circuit 780 samples the reflection coefficient (S11) of the transmitting signal Vt and generates the feedback signal Vf. In an embodiment, when the reflection of the signal is slight (the reflection coefficient is low), the electric potential of the generated feedback signal Vf is lower, when reflection of the signal is obvious (the reflection coefficient is high), the electric potential of the generated feedback signal Vf is higher. Consequently, when the impedance value of the first impedance Z1 adjusted by the calculating circuit 660 according to the inductive signal Vsen makes the electric potential of the feedback signal Vf corresponding to the feedback circuit 780 lower, which represents that the manner of the adjustment is right and the capacitance value can be further reduced. Conversely, when the impedance value of the first impedance Z1 adjusted by the calculating circuit 660 according to the inductive signal Vsen makes the electric potential of the feedback signal Vf corresponding to the feedback circuit 780 higher, which represents that the manner of the adjustment is wrong and the capacitance value needs to be increased, as a result, the operating frequency can be adjusted in real time to reduce the signal reflection. The high and low electric potential referred in the above embodiments is only an example, the relative change of the electric potential is different in different embodiments.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A wireless communication circuit, used for an electronic device, comprising:
    a wireless transceiver unit configured to generate a transmitting signal;
    an impedance matching unit electrically coupled to the wireless transceiver unit, wherein the impedance matching unit includes at least one impedance, the impedance matching unit is configured to convert the transmitting signal to a feeding signal according to an impedance value of the impedance;
    a coupling unit disposed on a first surface of the electronic device and electrically coupled to the impedance matching unit, configured to radiate energy of the feeding signal; and
    a system grounding surface configured to receive energy of the feeding signal and transmit a first electromagnetic wave signal via resonance.

2. The wireless communication circuit according to claim 1, wherein the system grounding surface is further configured to receive a second electromagnetic wave signal and radiate the energy of the second electromagnetic wave signal to the coupling unit via resonance, the coupling unit is configured to receive the energy of the second electromagnetic wave signal and generate an outputting signal to the impedance matching unit, the impedance matching unit is configured to convert the outputting signal to a receiving signal according to the impedance value of the at least one impedance to transmit to the wireless transceiver unit.

3. The wireless communication circuit according to claim 2, wherein the system grounding surface includes a major axis and a minor axis, the coupling unit and the system grounding surface are arranged separating from each other, after the system grounding surface receives energy of the feeding signal or the second electromagnetic wave signal, a dominant mode resonant current and a subdominant mode resonant current are generated along the major axis.

4. The wireless communication circuit according to claim 2, wherein the at least one impedance includes a first impedance, a first end of the first impedance is used to receive the transmitting signal or output the receiving signal, and a second end of the first impedance is used to output the feeding signal or receive the outputting signal.

5. The wireless communication circuit according to claim 1, wherein the system grounding surface includes a metal back cover, the metal back cover is disposed on a second surface of the electronic device.

6. The wireless communication circuit according to claim 1, wherein the coupling unit includes a slot hole.

7. An electronic device, comprising:
    a wireless communication circuit, comprising:
        a wireless transceiver unit configured to generate a transmitting signal;
        an impedance matching unit electrically coupled to the wireless transceiver unit, including at least one impedance, and configured to convert the transmitting signal to a feeding signal according to an impedance value of the at least one impedance;
        a coupling unit disposed on at least one first surface of the electronic device and electrically coupled to the impedance matching unit configured to radiate energy of the feeding signal; and
        a system grounding surface configured to receive energy of the feeding signal and transmit a first electromagnetic wave via resonance,
        a storage circuit configured to store a plurality of frequency band data;
        a calculating circuit electrically coupled to the storage circuit and the impedance matching unit, configured to generate a control signal according to the frequency band data to adjust the impedance value of the at least one impedance of the impedance matching unit.

8. The electronic device according to claim 7, wherein the electronic device further includes an induced circuit and a feedback circuit, the induced circuit and the feedback circuit are electrically coupled to the calculating circuit, the induced circuit is configured to detect the distance between an object and the electronic device and generate an inductive signal, the feedback circuit is configured to generate a feedback signal according to the transmitting signal and a corresponding reflecting signal, the calculating circuit is further configured to generate the control signal according to the inductive signal and the feedback signal.

9. The electronic device according to claim 7, wherein the system grounding surface is further configured to receive a second electromagnetic wave signal and radiate the energy of the second electromagnetic wave signal to the coupling unit via resonance, the coupling unit is further configured to receive the energy of the second electromagnetic wave signal and generate an outputting signal to the impedance matching unit, the impedance matching unit is configured to convert the outputting signal to a receiving signal according to the impedance value of the at least one impedance to transmit to the wireless transceiver unit.

10. The electronic device according to claim 9, wherein the system grounding surface includes a major axis and a minor axis, the coupling unit and the system grounding surface are arranged separating from each other, after the system grounding surface receives the energy of the feeding signal or the second electromagnetic wave signal, a dominant mode resonant current and a subdominant mode resonant current are generated along the major axis.

11. The electronic device according to claim 9, wherein the at least one impedance includes a first impedance, a first end of the first impedance is used to receive the transmitting signal or output the receiving signal, and a second end of the first impedance is used to output the feeding signal or receive the outputting signal.

12. The electronic device according to claim 9, wherein the least one impedance further includes a second impedance, a third impedance, a fourth impedance and a fifth impedance, a first end of the second impedance is electrically coupled to the wireless transceiver to receive the transmitting signal or output the receiving signal, a second end of the second impedance is electrically coupled to a first end of the first impedance, a first end of the third impedance is electrically coupled to a second end of the first impedance, a second end of the third impedance is electrically coupled to the coupling unit to output the feeding signal or receive the outputting signal, a first end of the fourth impedance is electrically coupled to the first end of the first impedance and the second end of the second impedance, a second end of the fourth impedance is electrically coupled to a signal grounding point, a first end of the fifth impedance is electrically coupled to the second end of the first impedance and the first end of the third impedance, a second end of the fifth impedance is electrically coupled to the signal ground point, the feedback circuit is electrically coupled to the second end of the second impedance to receive the transmitting signal and a corresponding reflecting signal, the calculating circuit adjusts the impedance value of the first impedance according to the control signal.

* * * * *